US 011485500B2

(12) United States Patent
Poloni et al.

(10) Patent No.: US 11,485,500 B2
(45) Date of Patent: Nov. 1, 2022

(54) TEMPERATURE MONITORING UNIT FOR AIRCRAFT WING STRUCTURE AND ASSOCIATED INSTALLATION METHOD

(71) Applicant: BOMBARDIER INC., Dorval (CA)

(72) Inventors: Matthew Poloni, Toronto (CA); Robert Lewis Brackin, Jr., Colleyville, TX (US); Dave James Thomas, Waxahachie, TX (US)

(73) Assignee: BOMBARDIER INC., Dorval (CA)

( * ) Notice: Subject to any disclaimer, the term of this patent is extended or adjusted under 35 U.S.C. 154(b) by 830 days.

(21) Appl. No.: 16/311,328

(22) PCT Filed: Jun. 27, 2017

(86) PCT No.: PCT/US2017/039548
§ 371 (c)(1),
(2) Date: Dec. 19, 2018

(87) PCT Pub. No.: WO2018/005529
PCT Pub. Date: Jan. 4, 2018

(65) Prior Publication Data
US 2019/0233126 A1    Aug. 1, 2019

Related U.S. Application Data

(60) Provisional application No. 62/356,329, filed on Jun. 29, 2016.

(51) Int. Cl.
*B64D 15/00* (2006.01)
*B64D 15/04* (2006.01)
(Continued)

(52) U.S. Cl.
CPC ............... *B64D 15/04* (2013.01); *B64C 3/00* (2013.01); *B64C 3/28* (2013.01); *B64C 9/22* (2013.01);
(Continued)

(58) Field of Classification Search
CPC .... B64C 3/00; B64C 3/16; B64C 3/28; B64C 2003/146; B64C 9/22; B64C 15/00;
(Continued)

(56) References Cited

U.S. PATENT DOCUMENTS 4,615,499 A * 10/1986 Knowler ................ B64D 15/04
244/134 B
5,294,909 A * 3/1994 Frazier .................. G01M 3/045
338/214
(Continued)

FOREIGN PATENT DOCUMENTS

| CN | 103775831 A | 5/2014 |
|---|---|---|
| EP | 2957877 A1 | 12/2015 |
| EP | 3009818 A1 | 4/2016 |

OTHER PUBLICATIONS

PCT International Search Report and Written Opinion dated Sep. 6, 2017, re: International Application No. PCT/US2017/039548.
(Continued)

*Primary Examiner* — Richard R. Green
*Assistant Examiner* — Michael A. Fabula
(74) *Attorney, Agent, or Firm* — Norton Rose Fulbright Canada LLP

(57) ABSTRACT

A temperature monitoring unit may be removably installed inside an aircraft wing structure for monitoring temperature conditions along the span of the wing. The wing structure has a temperature-sensitive device (162) for monitoring a temperature condition, which is attached to a support frame (173). The support frame and attached temperature-sensitive device may be installed as a unit within the wing structure. The support frame may be configured for sliding engagement inside the wing structure, for example, with a set of tracks.

10 Claims, 12 Drawing Sheets

(51) Int. Cl.
*B64C 9/22* (2006.01)
*G01K 7/16* (2006.01)
*G01K 11/06* (2006.01)
*B64D 45/00* (2006.01)
*B64C 3/00* (2006.01)
*B64C 3/28* (2006.01)
*B64C 3/14* (2006.01)

(52) U.S. Cl.
CPC ............... *B64D 45/00* (2013.01); *G01K 7/16* (2013.01); *G01K 11/06* (2013.01); *B64C 2003/146* (2013.01)

(58) Field of Classification Search
CPC ......... B64C 15/02; B64C 15/04; B64C 15/20; B64C 15/22; B64C 45/00
See application file for complete search history.

(56) References Cited

U.S. PATENT DOCUMENTS

| | | | |
|---|---|---|---|
| 6,394,396 B2 * | 5/2002 | Gleine | B64D 15/04 244/198 |
| 6,467,730 B2 * | 10/2002 | Laugt | B64D 15/04 244/123.14 |
| 7,155,961 B2 | 1/2007 | Fernandes et al. | |
| 7,356,438 B2 * | 4/2008 | Schaumann | G01K 3/14 374/E3.009 |
| 8,226,048 B2 * | 7/2012 | Beyer | B64C 9/24 244/214 |
| 8,579,236 B2 * | 11/2013 | Wollaston | B64C 9/22 244/214 |
| 8,708,554 B2 | 4/2014 | Thompson et al. | |
| 8,967,185 B2 | 3/2015 | Fernandes et al. | |
| 2010/0176243 A1 | 7/2010 | Nieman et al. | |
| 2011/0163841 A1 | 7/2011 | Gordon et al. | |
| 2013/0327127 A1 | 12/2013 | Osthus et al. | |
| 2017/0108395 A1 * | 4/2017 | Rogers | G01M 3/002 |

OTHER PUBLICATIONS

English translation of patent document No. CN 103775831 dated May 7, 2014, https://patents.google.com/patent/CN103775831A/en?oq=cn++103775831, accessed on Dec. 17, 2018.

* cited by examiner

TEMPERATURE MONITORING UNIT FOR AIRCRAFT WING STRUCTURE AND ASSOCIATED INSTALLATION METHOD

CROSS-REFERENCE TO RELATED APPLICATIONS

The present application is a national phase application under 35 U.S.C. 371 of International Patent Application No. PCT/US2017/039548 filed on Jun. 27, 2017, which claims priority from U.S. Provisional Patent Application Ser. No. 62/356,329, entitled "TEMPERATURE MONITORING UNIT FOR AIRCRAFT WING STRUCTURE AND ASSOCIATED INSTALLATION METHOD," filed Jun. 29, 2016, the entire content of which is hereby incorporated by reference.

FIELD

This relates to aircraft ice protection systems, and more particularly, to methods and apparatus for monitoring an operation of aircraft anti-icing systems.

BACKGROUND

Many aircraft have systems designed to heat wing surfaces to prevent formation or buildup of ice. Heating may be achieved by delivering hot air, often referred to as bleed air, from the aircraft's engines to the wings by way of a series of ducts.

Bleed air may be drawn from the engines and delivered to the wings at high temperatures. Accordingly, bleed air systems may be designed to vent air against an interior side of wing skins at a controlled rate to avoid overheating. Nevertheless, monitoring may be provided to ensure that bleed air anti-icing systems are operating as intended (e.g., without excessive leaks) and that temperatures within the wings do not exceed safe levels.

Typically, temperature monitoring is done using suitable sensor wires. Unfortunately, such wires are cumbersome to install and maintain.

SUMMARY

An example temperature monitoring unit for removable installation inside an aircraft wing structure and for monitoring a temperature condition over a span of the wing structure comprises: a support frame; a temperature-sensitive device attached to the support frame for monitoring the temperature condition over the span of the wing structure, the support frame and the temperature-sensitive device being configured for removable installation as a unit inside the aircraft wing structure.

The support frame may be configured for sliding engagement inside the aircraft wing structure.

The temperature monitoring unit may comprise fasteners for installing the support frame to the aircraft wing structure, and retainers for supporting the temperature-sensitive device on the support frame, wherein the number of the retainers is greater than the number of the fasteners.

The support frame may comprise a plurality of holes for reception of the fasteners, and wherein the holes are positioned to be accessible through a lateral opening of the aerodynamic device.

At least part of the support frame may be configured for reception in a channel defined in the wing structure.

The support frame may comprise a locating feature for mating engagement with a corresponding locating feature of the wing structure.

The locating features may comprise a track.

The temperature monitoring unit may comprise a back plate received in a corresponding track on the wing structure.

The temperature monitoring unit may comprise a plurality of parallel conductors extending along the span of the wing structure, the conductors in electrical communication only at or above a threshold temperature.

The conductors may be separated by an insulator that melts at the threshold temperature.

The aerodynamic device is a movable slat and the support frame is removable from the slat through a lateral opening in the slat.

The temperature monitoring unit may comprise an interface for joining the temperature-sensitive device to a monitoring system of an aircraft.

The temperature monitoring unit may comprise a retention bracket for attaching an end of the temperature sensitive device to the support frame, the retention bracket mounted to the support frame in an adjustable position.

An example aircraft may comprise the temperature monitoring unit.

Embodiments may include combinations of the above features.

An example aircraft wing structure comprises: a skin defining an aerodynamic surface; a structural element disposed in an interior volume of the aircraft wing structure at least partly defined by the skin; and a temperature monitoring unit removably installed as a unit in the interior volume the aircraft wing structure, comprising: a support frame removably installed to the structural element; and a temperature-sensitive device for monitoring a temperature condition over a span of the wing structure, the temperature sensitive device being attached to the support frame.

The structural element may define a channel within the interior volume, and wherein the support frame is slidably received in the channel.

The support frame may be installed to the structural element using fasteners, and the temperature-sensitive device is attached to the support frame using retainers, wherein the number of the retainers is greater than the number of the fasteners.

The support frame may comprise a locating feature for mating engagement with a corresponding locating feature on the structural element.

The locating features may comprise a track.

The temperature sensitive device may comprise a plurality of parallel conductors extending along the span of the wing structure, the conductors in electrical communication with one another only at or above a threshold temperature.

The aircraft wing structure may be a movable leading edge slat.

The movable leading edge slat may define a lateral opening when extended, and wherein the channel is positioned for reception of the support frame through the lateral opening.

The structural element may be a spar.

The support frame may be mounted to the structural element to position the temperature-sensitive element along an anti-icing duct.

The aircraft wing structure may comprise an interface for joining the temperature-sensitive device to a monitoring system of an aircraft.

An example aircraft may have the wing structure described herein.

Embodiments may include combinations of the above features.

An example method of installing a temperature monitoring unit for an anti-icing system in an aircraft wing structure, the method comprises: assembling the temperature monitoring unit by attaching a temperature-sensitive device to a support frame, the temperature-sensitive device being configured to monitor a temperature condition over a span of the aircraft wing structure; and removably installing the temperature monitoring unit inside the aircraft wing structure.

The method may comprise sliding the support frame within a channel defined by a structural member of the aircraft wing structure.

The method may comprise bringing a base of the support frame into abutment with the structural member to limit the sliding.

The temperature sensitive device may comprise a temperature-monitoring wire, the method comprising attaching the temperature-monitoring wire to the support frame at a plurality of first locations, and removably fastening the support frame to the structural member at a plurality of second locations, wherein the first locations are spaced more closely than the second locations.

The wing structure may comprise a movable leading edge slat.

The method may comprise deploying the movable slat to provide access to a lateral opening and inserting the temperature monitoring unit through the lateral opening.

The wing structure may comprise a fixed leading edge.

The method may comprise attaching the temperature sensitive device to a retention bracket, adjusting a position of the retention bracket so that the temperature sensitive device is taut, and locking the retention bracket to the support frame.

Embodiments may include combinations of the above features.

BRIEF DESCRIPTION OF DRAWINGS

In the figures, which depict example embodiments.

DETAILED DESCRIPTION

The present disclosure relates to ice protection systems of aircraft. In particular, temperature monitoring units for anti-icing systems and associated installation methods are disclosed. In various embodiments, aspects of the present disclosure may facilitate installation and maintenance of temperature monitoring equipment inside of aircraft structures such as leading edges of aircraft wings. In some embodiments, a temperature monitoring unit including a temperature-sensitive device attached to a support frame may be removably installed inside an aircraft structure as a unit. The temperature-sensitive device may be attached to the support frame externally to the aircraft and subsequently installed as a unit in the aircraft structure.

The support frame may provide support for monitoring wires, and may allow for installation of the support frame and wires as a single assembled unit, e.g. a removable in-line unit. The support frame may be removably installed to an aircraft structural member at discrete locations along the length of the support frame, while the support frame may support the wires continuously or at tightly-spaced locations along the length of the wires.

Figure 1:
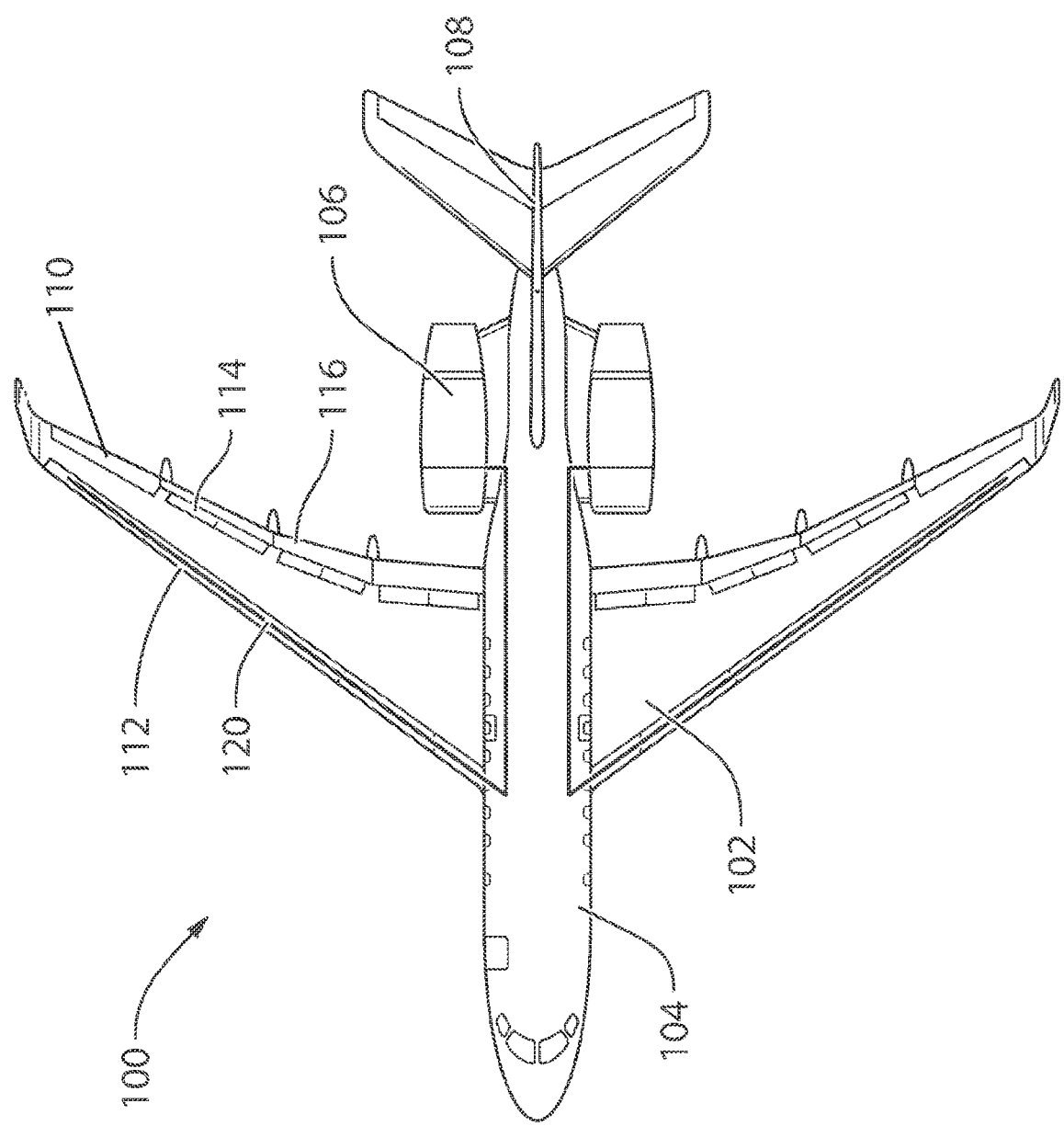
FIG. 1 is a plan view of an aircraft.

FIG. 1 is a top plan view of an example aircraft 100. Aircraft 100 may be any type of aircraft, such as corporate (e.g. business jet), private, commercial or passenger aircraft. For example, aircraft 100 may be a narrow-body, twin-engine jetliner. Aircraft 100 may be a fixed-wing aircraft.

Aircraft 100 may comprise wing structures such as one or more wings 102, vertical and horizontal stabilizers 108, aileron(s) 110, leading edge slat(s) 112, spoiler(s) 114 and trailing edge flap(s) 116. Aircraft 100 may further comprise fuselage 104 and one or more engines 106. One or more of engines 106 may be mounted to fuselage 104. Alternatively, or in addition, one or more of engines 106 may be mounted to wings 102. Leading edge slats 112 and trailing edge flaps 116 may be considered "high-lift" flight control surfaces that may be deployed to increase the amount of lift generated by wings 102 during landing, take-off and/or during any other appropriate phases of flight or conditions requiring increased lift. One or more trailing edge flaps 116 may be disposed at or near a trailing edge of each wing 102 and may define at least a portion of a trailing edge of each wing 102.

Figure 2:
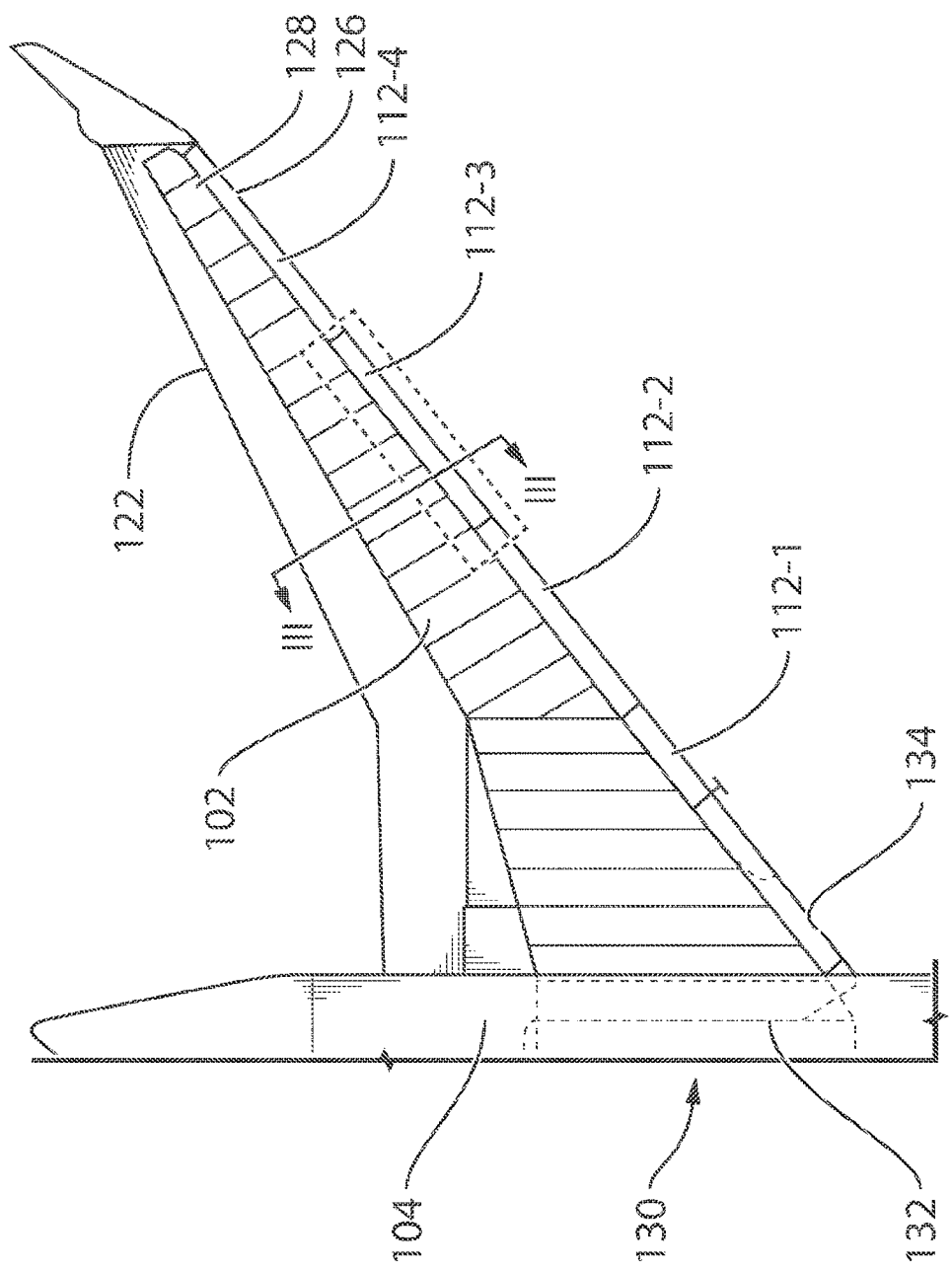
FIG. 2 is a plan view of a wing of the aircraft of FIG. 1.

FIG. 2 is a top plan view showing a wing 102 and leading edge slats 112 in greater detail. As depicted, each wing 102 carries four slats 112-1, 112-2, 112-3, 112-4. However, more or fewer slats 112 may be present. Wing 102 has a leading edge 120 and a trailing edge 122. Each of slats 112 has a leading edge 126 and a trailing edge 128.

Each slat 112 is movably mounted to wing 102 such that the slats 112 can be deployed (extended) or retracted, to define a relatively high-lift, high-drag or a relatively low-lift, low-drag configuration, respectively. As explained below, the slats 112 may be individually deployed to facilitate installation and maintenance of the temperature monitoring unit.

Aircraft 100 is equipped with an anti-icing system 130. Anti-icing system 130 carries hot air from engines 106 to wings 102/slats 112 to warm the surfaces thereof, thereby preventing ice formation or buildup. Anti-icing system 130 has an intake which receives air from one or more compressor stages of engine 106.

Depending on the location of engine 106 on aircraft 100, anti-icing system 130 may have a fuselage duct 132. Fuselage duct 132 is located within fuselage 104 and runs along at least part of the length of fuselage 104. Fuselage duct 132 supplies air to a distribution duct, such as a piccolo duct 134, for carrying and distributing air over a span of wing 102.

Figure 3A:
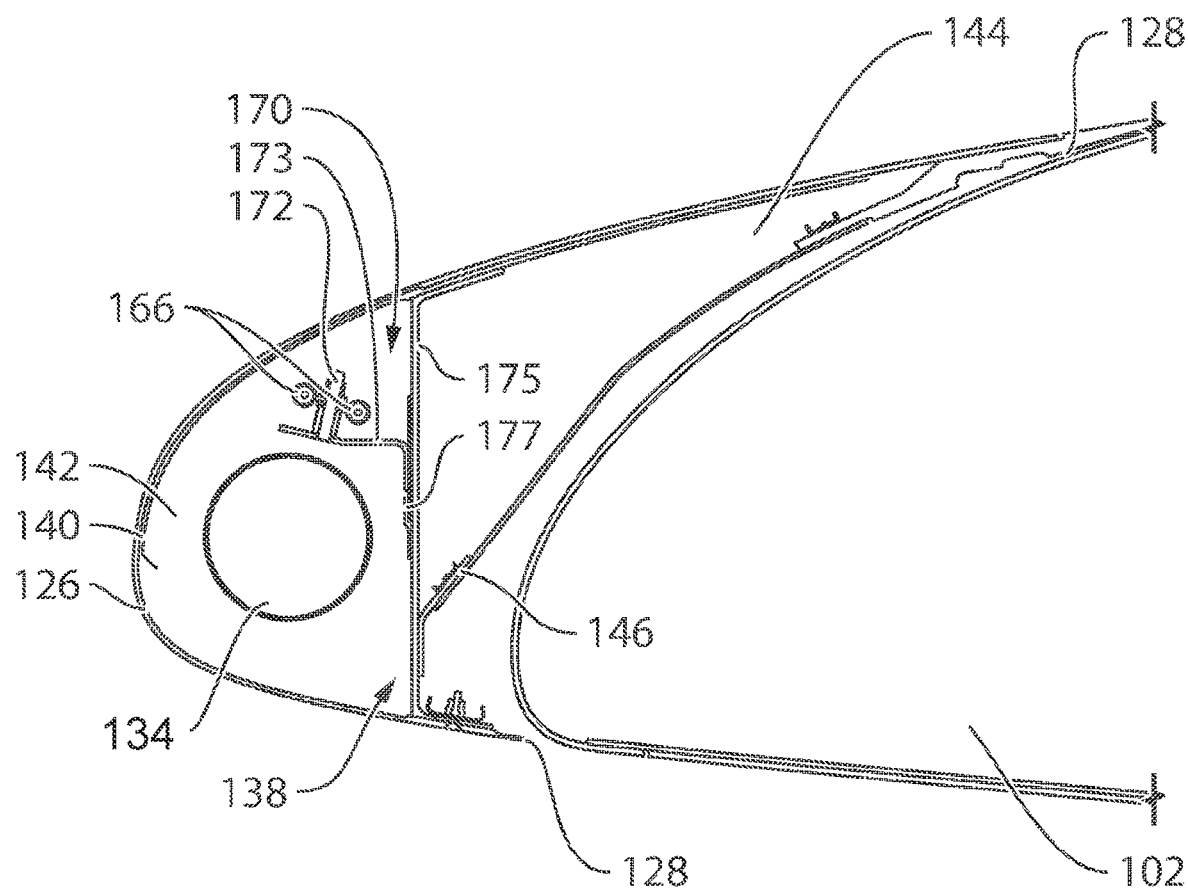
FIG. 3A is a side cross-sectional view of a slat of the wing of FIG. 2, in a retracted position.
Figure 3B:
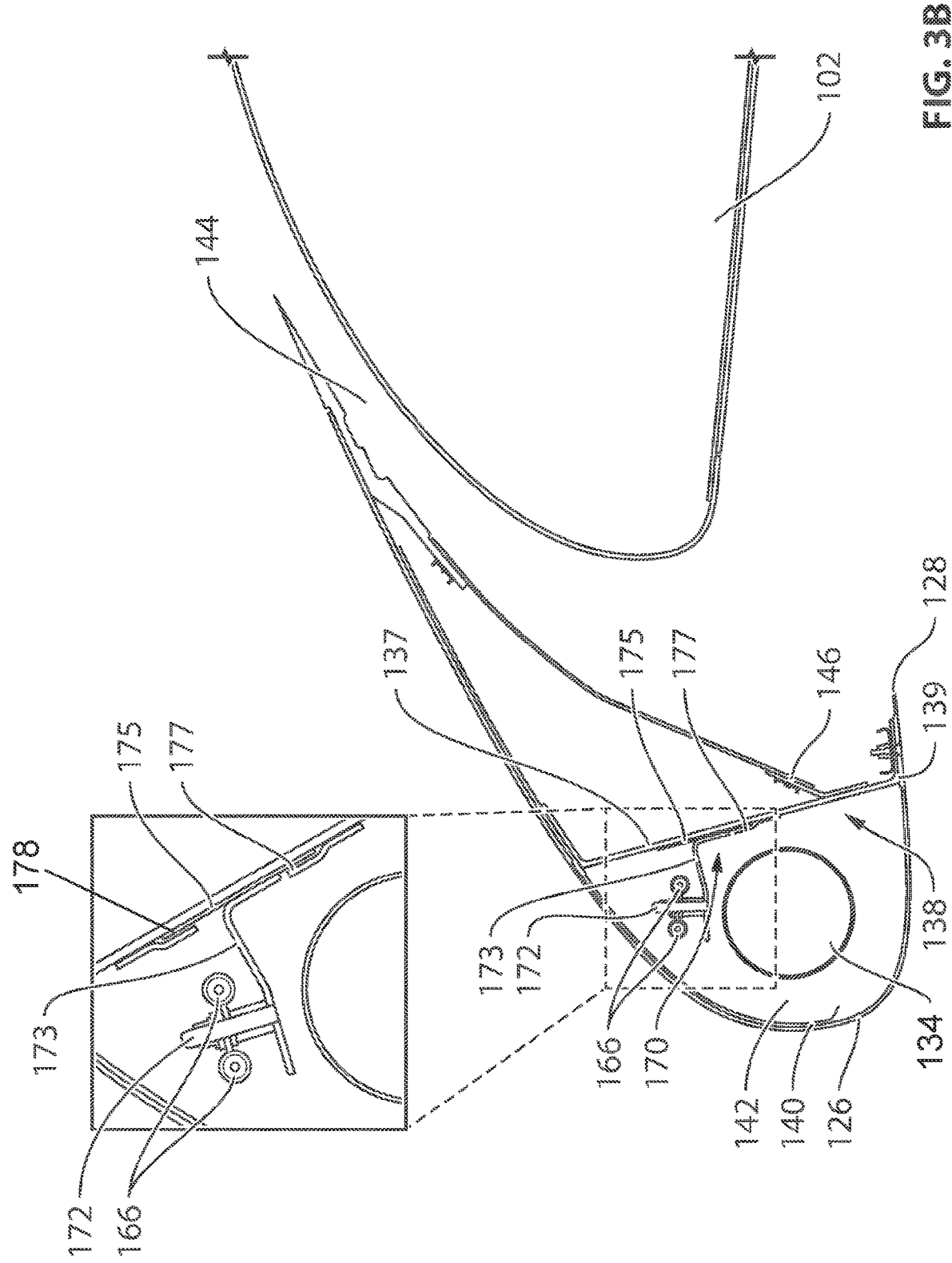
FIG. 3B is a side cross-sectional view of a slat of the wing of FIG. 2, in a deployed position, with a portion enlarged to show details of a support frame.

FIGS. 3A-3B are simplified side cross sectional views of wing 102 and a slat 112, taken along line III-III shown in FIG. 2. FIG. 3A depicts a retracted position of slat 112 and FIG. 3B depicts a deployed position of slat 112. Slats 112 may be movably mounted, for example, to tracks extending from wing 102 and anti-icing air may be fed to slats 112 by one or more telescoping ducts (not shown) according to known or other methods.

Slat 112 has an aerodynamic surface defined by outer skin 140, which is supported directly or indirectly by one or more structural elements such as spar 138. Spar 138 extends along the span of the slat and provides structural strength to carry flight loads. Spar 138 and outer skin 140 cooperatively define fore and aft chambers 142, 144 within slat 112. Spar 138 has a web section 137 and top and bottom flange sections 139. A channel may extend along the span of the slat 112. For example, a set of tracks 177 may be mounted to spar 138 and may extend across spar 138, defining a channel.

Slat 112 has a back wall 146. In the retracted position of slat 112 (FIG. 3A), back wall 146 is located proximate the surface of wing 102. In the deployed position, with slat 112 extended, back wall 146 is accessible from behind and beneath slat 112.

Figure 3C:
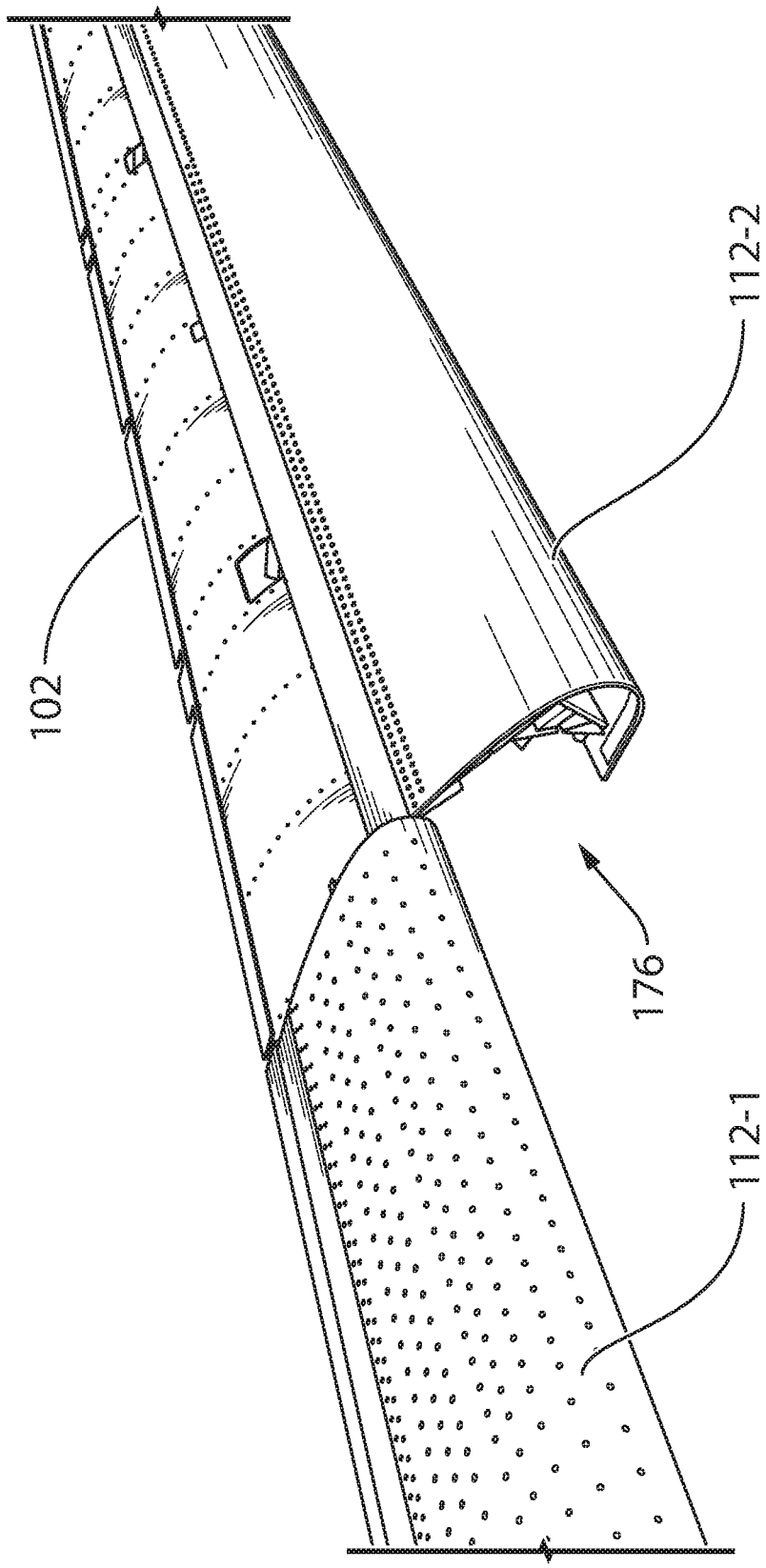
FIG. 3C is a perspective view of first and second slats of the wing of FIG. 2, with one slat deployed.

FIG. 3C shows a perspective view of two adjacent slats 112-1, 112-2, with slat 112-1 in its retracted position and slat 112-2 in its deployed (extended) position. Slats 112 have removable side walls. During flight, the side walls are in place, closing off the ends of slats 112. However, during maintenance, the side walls may be removed, such that, with one slat deployed and adjacent slats retracted, the interior of the deployed slat is accessible through openings 176 at its inboard and outboard sides.

Figure 3D:
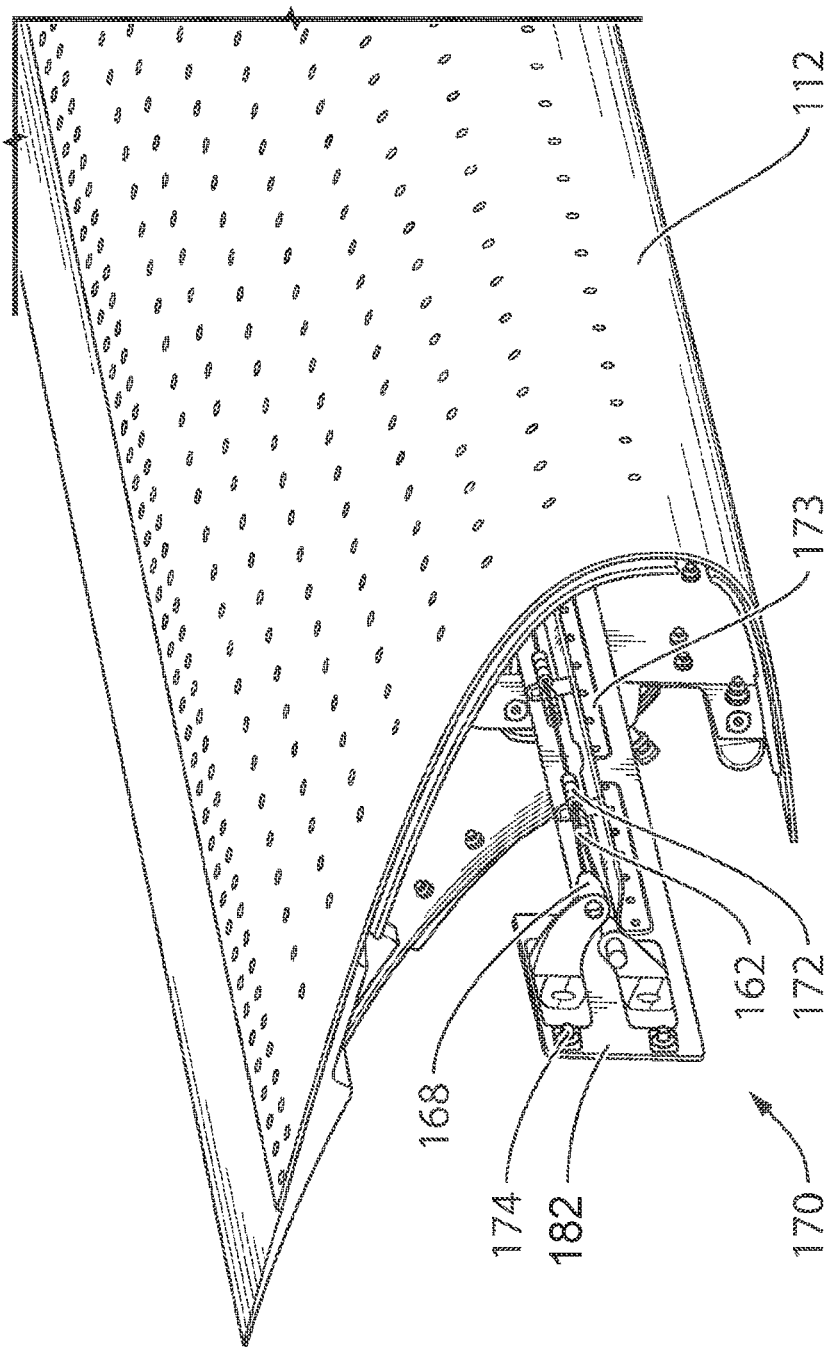
FIG. 3D is a perspective view of a slat of the wing of FIG. 2, with a temperature monitoring unit installed.

FIG. 3D is a perspective view of a slat 112 with a temperature monitoring unit installed, as described in further detail below.

Figure 4:
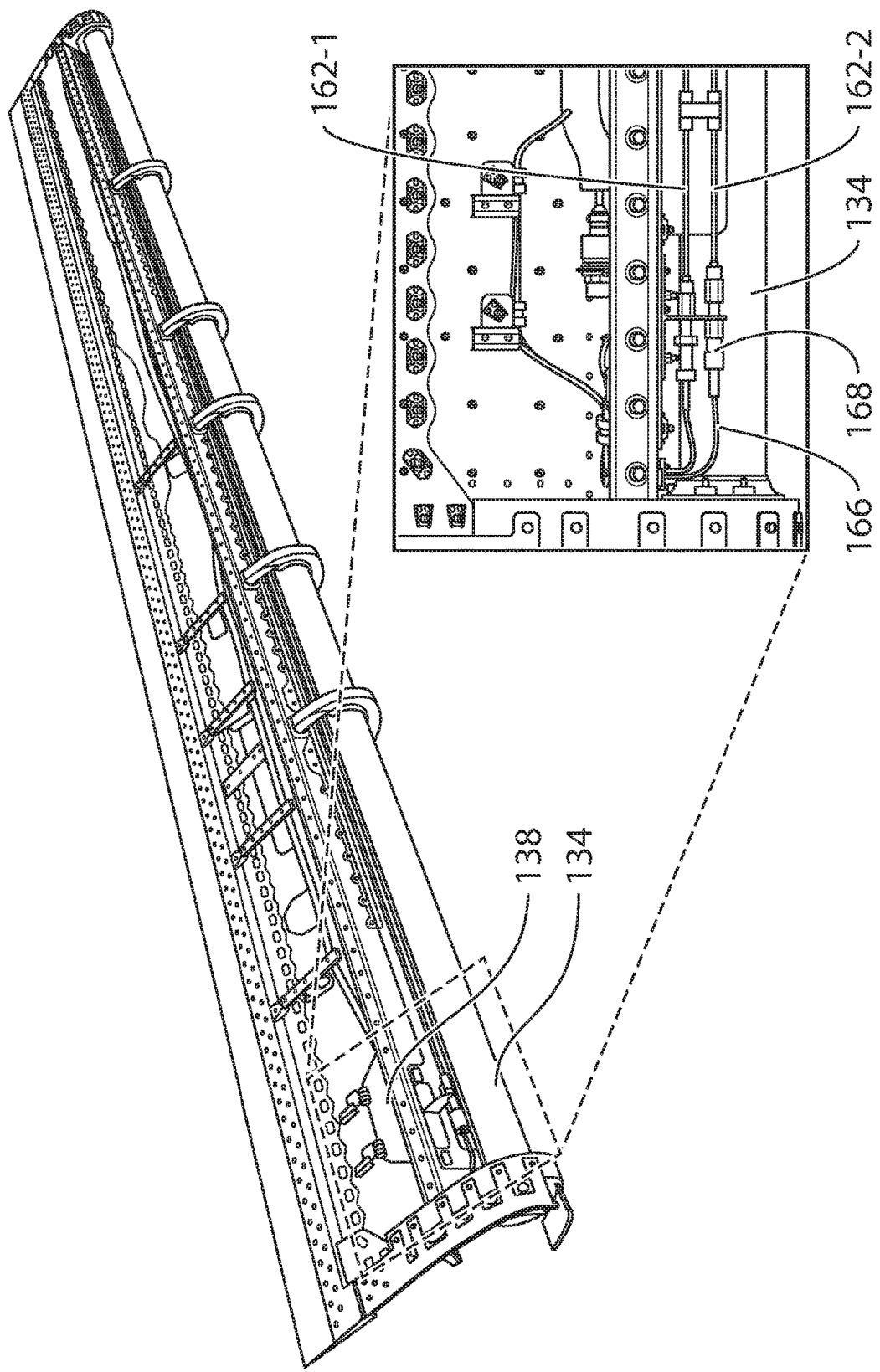
FIG. 4 is a perspective view of a slat of the wing of FIG. 2, with the outer skin of the slat removed.

FIG. 4 is a perspective view of a portion of a slat 112, with outer skin 140 removed to show internal components. Piccolo duct 134 runs within slats 112 and at least partially along a span of slats, and extends away from fuselage 104, substantially to the tip of wing 102. Piccolo duct 134 may extend along substantially an entire span of the wing 102 or along a span of the wing 102 that is less than the entire span of the wing 102. Similarly, piccolo duct 134 may extend along substantially the entire span of the slat 112 or along a span of the slat 112 that is less than the entire span of the slat 112. Piccolo duct 134 has a series of apertures 136. Air within piccolo duct 134 is pressurized, such that air is vented through apertures 136. Apertures 136 are positioned to direct the vented air against the skin of the slats 112.

As depicted, air from piccolo duct 134 is directed through apertures 136 into fore chamber 142 against outer skin 140. Specifically, air from piccolo duct 134 is introduced into fore chamber 142 and routed along a passage under outer skin 140. The air is then discharged into aft chamber 144 and through an exhaust opening. Circulation of hot air transfers heat to outer skin 140, causing warming of the outer skin 140. Warming of the outer skin 140 limits formation and buildup of ice on wing.

As noted, warming air may be supplied to piccolo duct 134 from engines 106. Accordingly, air within piccolo duct 134 may be at relatively high temperatures. For example, during steady flight, air within piccolo duct 134 may typically be between 216° C. and 285° C.

Accordingly, discharge of air at an excessive rate or excessive temperature may cause overheating of wing skin 140. Air discharged through piccolo duct 134 may even be sufficiently hot to create a fire hazard. Slats 112 are therefore provided with a hot air monitoring system for monitoring operating conditions such as temperature within slats 112 and providing signals indicative of such conditions to a monitoring system which may provide a suitable warning indication in the cockpit of aircraft 100.

The hot air monitoring system includes at least one temperature sensitive device 162. Temperature-sensitive device 162 may, for example, be a wire which does not conduct electricity below a threshold temperature, but which does conduct electricity above the threshold temperature. By way of example, one such type of wire has a parallel inner conductor and a outer conductive sheath, with a space between the conductors occupied by an electrically-insulating eutectic salt. Upon reaching a threshold temperature, the salt melts, allowing conduction of electricity between the inner and outer conductors. Temperature-sensitive device 162 may be, for example, elements produced by Fenwall with part number 1052009-LLLt, where L indicates the length of the wire, and T indicates the temperature setting for the wire.

Each temperature-sensitive device 162 is connected to a monitoring device by way of power wires 166 and couplings 168. Specifically, the monitoring device may apply a voltage to one of the inner and the outer conductor and monitor resistance between the inner and outer conductors to determine electrical continuity. Alternatively, the monitoring device may include an ammeter for measuring current flow between the inner and outer conductors.

The inner and outer conductors form a complete circuit only upon reaching the threshold temperature. The two conductors are placed in electrical contact with one another. Apparent resistance between the two conductors may drop to a low value and current may begin to flow. Thus, a short circuit between the conductors, measured by a continuity check or by current flowing through temperature-sensitive devices 162, is indicative of an overheat condition. A coupling may be provided for sending a signal from the monitoring device to control systems in the cockpit of aircraft 100.

As depicted, the hot air monitoring system includes two temperature-sensitive devices 162-1, 162-2. In some embodiments, temperature-sensitive devices 162-1, 162-2 may be identical, and may be provided for redundancy. Voltage may be applied to temperature-sensitive devices 162-1, 162-2 in opposite polarity. Temperature-sensitive devices 162-1, 162-2 may be connected to the monitoring device on different channels. Thus, temperature-sensitive devices 162-1, 162-2 may provide monitoring redundancy. In other embodiments, temperature-sensitive devices 162-1, 162-2 may be configured to become conductive at different temperatures. In such embodiments, current flowing through the sensors may be indicative of two different temperatures.

Although two temperature-sensitive devices 162 are depicted in FIG. 4, in other embodiments, more or fewer conductors may be present.

Temperature-sensitive devices 162 may extend substantially across the entire or partial span of wing 102 or of slat 112 in order to monitor temperature conditions at any point over the span. In some embodiments, temperature-sensitive devices 162 may be configured to monitor the temperature condition over the span in a continuous (i.e., uninterrupted) manner or at discrete points intermittently spaced along the span. In some embodiments, temperature-sensitive devices 162 may be provided in sections, with one section for each slat 112. Sections of adjacent slats may be electrically coupled to one another at their ends. In such embodiments, temperature-sensitive devices 162 of each slat 112 may be presented with voltage from a single voltage source.

In other embodiments, each section of temperature-sensitive devices 162 in each slat 112, may be electrically isolated from one another. Each section may be provided with its own monitoring device, and may be electrically isolated from sections in other slats 112. Measurements by the monitoring devices may be used to not only identify the existence of a fault condition, but also the slat in which the fault condition is located.

Temperature-sensitive devices 162 may be mounted to a support frame 170 to form a monitoring unit 171. Temperature-sensitive devices 162 may need to be handled carefully and properly supported to avoid bending or kinking, which may interfere with monitoring. For example, a kink in a temperature-sensitive device 62 may cause the inner and outer conductors to contact one another, which may cause an apparent overheating signal. Thus, support frame 170 is configured to support temperature-sensitive devices 162 along their length to guard against bending or kinking.

Support frame 170 may be, for example, a tray formed from metal, plastic or other suitable materials. Alternatively, support frame 170 may be a cage, a mesh plate, a truss or other supporting structure. As best shown in the enlarged portion of FIG. 3B, in some embodiments, support frame 170 may include a carrier 173 attached to a back plate 175. Carrier 173 may be an elongated bent plate or bracket.

Sensors 162 may be attached to support frame 170 using retainers 172 spaced along the length of sensors 162. Retainers 172 may, for example, be clips, pegs or the like, which engage temperature-sensitive devices 162 and carrier 173, e.g. frictionally using threads, or by interlocking engagement. Additionally or alternatively, retainers 172 may have eyelets through which devices 162 may be received.

In some embodiments, retainers 172 may be spaced at approximately constant intervals along the length of temperature-sensitive devices 162. In an example, retainers 172 may be spaced approximately 6"-8" from one another. Retainers 172 are spaced to prevent slack in temperature-sensitive devices 162 and to prevent temperature-sensitive devices 162 from contacting other parts of slat 112. Retainers 172 may be closely spaced in regions where temperature-sensitive devices 162 are close to slat components.

Temperature-sensitive devices 162 may be attached to support frame at one or both ends by way of adjustable brackets 179. Adjustable brackets 179 may mount to corresponding plates 181 on support frame 170. Adjustable brackets 170 and plates 181 may engage one another, for example, with interlocking teeth or serrations. The brackets and plates may be held in engagement by fasteners, e.g. bolts. The bolts may be received in slots, such that the position of each adjustable bracket 179 may be adjusted relative to the corresponding plate 181 (and thus, relative to support frame 170). Brackets 179 and plates 181 may be locked in place relative to one another by tightening of the fasteners. Such adjustment may account for tolerances in the lengths of temperature-sensitive elements 162. That is, brackets 179 and plates 181 may be adjusted to hold temperature-sensitive elements 162 taut despite small variations in length.

Support frame 170 may be formed from a metallic material selected for light weight, such as aluminum alloy. In an example, support frame 170 is formed from aluminum 2024-T3 sheet. Other suitable alloys may be used, such as those capable of withstanding temperatures produced by the anti-icing system and supporting the weight of temperature-sensitive devices 162, retainers 172 and associated components. Support frame 170 may have an elongated body and a base 182 and may be configured for sliding reception along spar 138. In some embodiments, support frame 170 may have locating features, such as grooves, tracks or runners, for engaging corresponding locating features on spar 138. For example, as depicted, a set of tracks 177 are fastened to spar 138. Tracks 177 define a channel 178 in which back plate 175 of support frame 170 can be slidably received. Thus, support frame 170 may be installed on aircraft 100 by inserting an end thereof in a channel 178 extending along spar 138, aligning support frame 170 locating features, e.g. tracks 177, on spar 138, and sliding support frame 170 along spar 138. Support frame 170 may be secured in its fully-installed position by fasteners inserted through holes or by other locating features on support frame 170 and spar 138.

Support frame 170 may be installed, for example, using fasteners 174 such as screws, bolts or rivets, which may be spaced apart at even intervals along the length of support frame 170. For example, support frame 170 may have fasteners 174 positioned at six locations along its length, approximately 16" from one another. In other embodiments, more or fewer fasteners may be used. Fasteners 174 may secure support frame 170 to one or both of web 137 or flanges 139 of spar 138.

In some embodiments, there may be more retainers 172 securing temperature-sensitive devices 162 to support frame 170 than there are fasteners 174 securing support frame 170 to spar 138. Moreover, retainers 172 may be closer to one another than fasteners 174. Such an arrangement may allow for appropriate support of the relatively fragile and ductile temperature-sensitive devices 162 along their length, while limiting labour and complication of installing the stiffer support frame 170 into aircraft 100.

For example, fasteners 174 may be placed at 6 locations along the length of support frame 170, while retainers 172 are placed at 10 or more locations along the length of support frame 170.

Figure 7A:
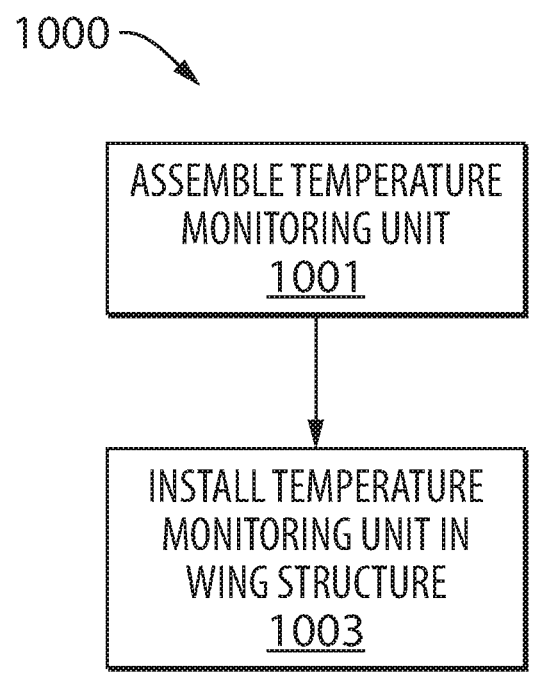
FIGS. 7A-7B are flow charts depicting an installation process of the monitoring unit of FIGS. 5-6.

FIG. 7A is a flow chart depicting a process 1000 of installation of monitoring unit 171 into aircraft 100.

At block 1001, the temperature monitoring unit is assembled. Temperature-sensitive devices 162 are attached to support frame 170.

At block 1003, temperature monitoring unit 170 is installed inside a wing structure of aircraft 100.

Figure 7B:
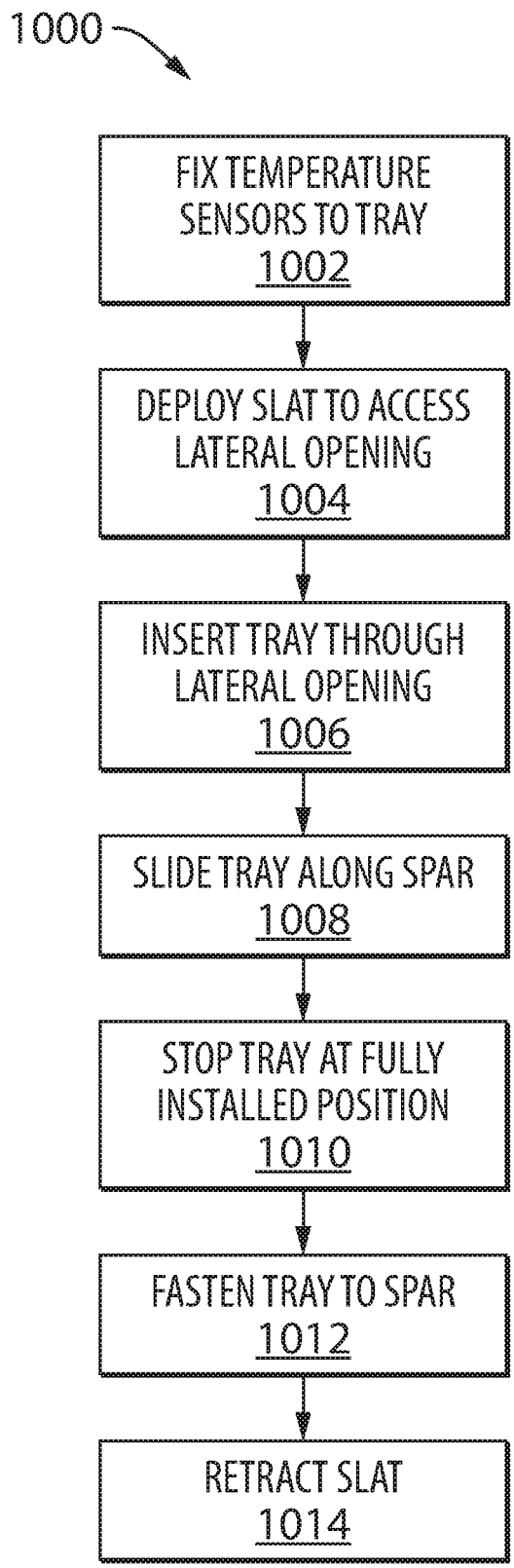

FIG. 7B is a flow chart depicting process 1000 in greater detail.

Figure 5:
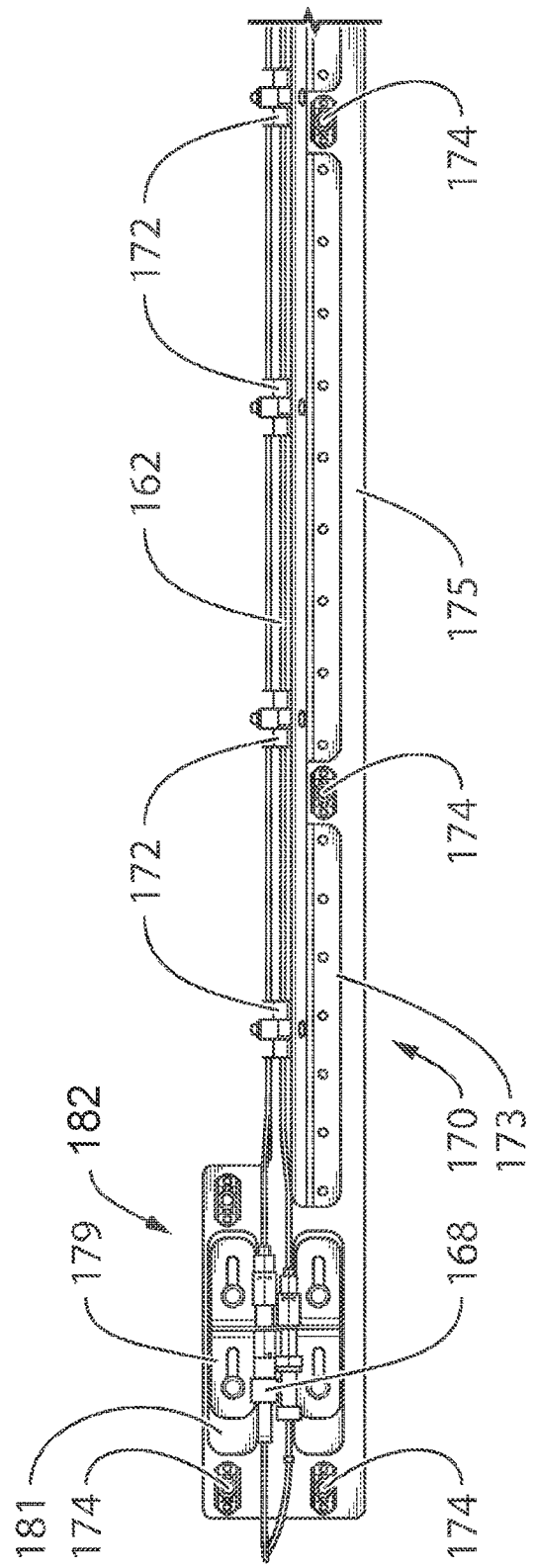
FIG. 5 is a front elevation view of a monitoring unit for the slat of FIG. 4.
Figure 6:
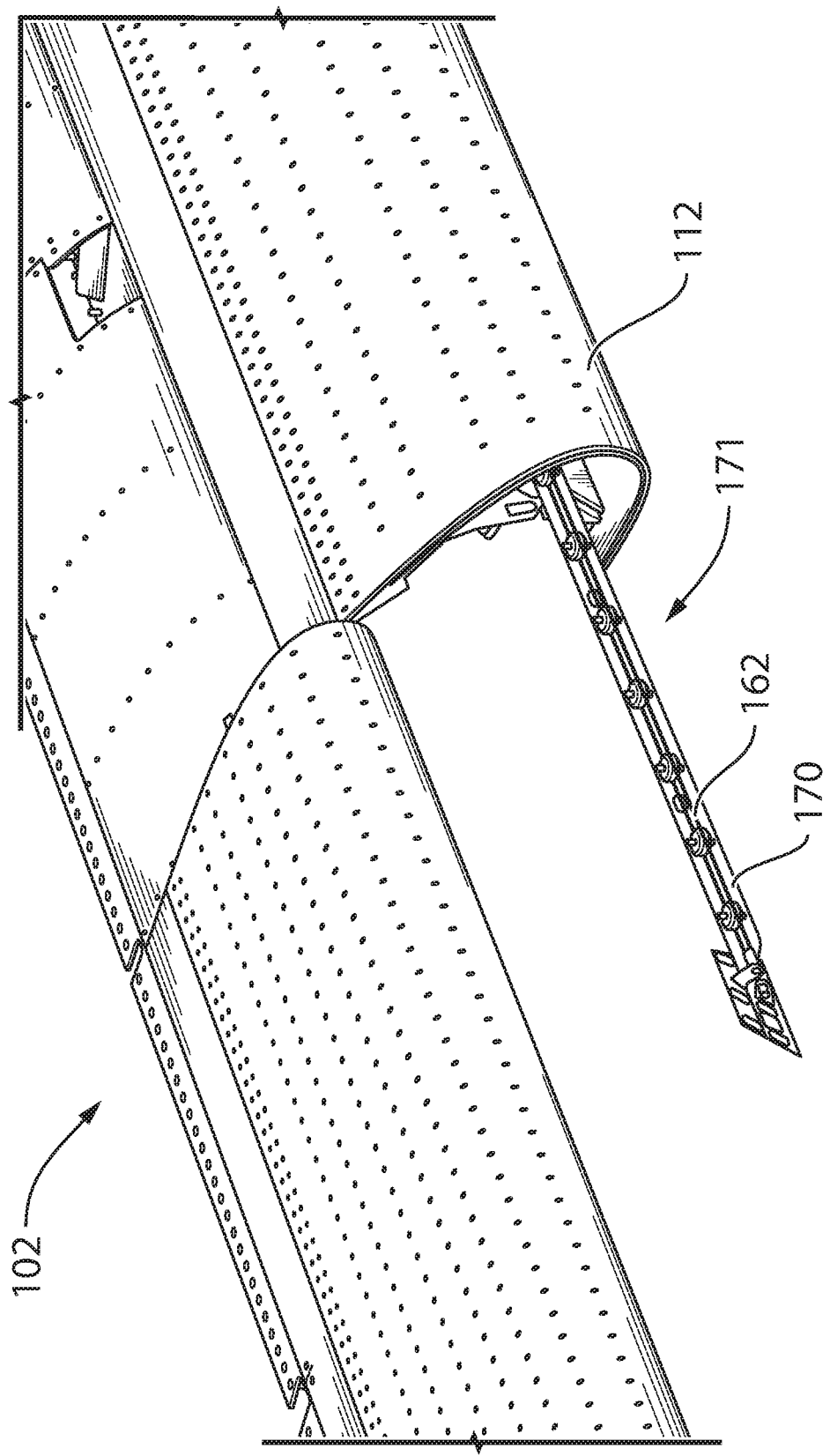
FIG. 6 is a perspective view of the monitoring unit of FIG. 5 being inserted into the slat.

At block 1002, as shown in FIG. 5, temperature-sensitive devices 162 may be attached onto support frame 170 while outside aircraft 100. Retainers 172 may be installed to secure temperature-sensitive devices 162 to support frame 170 along their length. As shown in FIG. 6, support frame 170 and temperature-sensitive devices 162 may be installed on aircraft 100 as a pre-assembled unit. Such temperature monitoring unit 171 may be a modular component designed to be replaced relatively easily and quickly in order to facilitate initial assembly and subsequent inspection or maintenance compared to traditional installations of temperature monitoring equipment. For example, temperature monitoring unit 171 may be considered a line-replaceable unit (LRU).

At block 1004 (FIG. 7B), a slat 112 is deployed with the adjacent slats retracted, providing access to the interior of the slat 112 through openings 176 in the slat's inboard or outboard end.

At block 1006, support frame 170 may be inserted into slat 112 through an opening 176. Support frame 170 may be positioned to align corresponding location features on support frame 170 and spar 138, e.g., to align and insert back plate 175 of support frame 170 in the channel defined by tracks 177.

At block 1008, support frame 170 may be slid into slat 112 along spar 138. Support frame 170 may directly slide against web 137 or flanges 139 of spar 138. Alternatively, corresponding locating features, such as tracks 177 and back plate 175 on the spar 138 and support frame 170 may form a sliding interface. Sliding of support frame 170 may be in the direction indicated by arrow I in FIG. 6.

At block 1010, support frame 170 is moved to its fully-installed position. The fully-installed position may be locating features on the support frame and spar 138. Alternatively or additionally, the fully-installed position may be defined by alignment of holes in support frame 170 for receiving fasteners 174 with corresponding holes in spar 138.

Temperature-sensitive devices 162 may be attached to support frame 170 by adjusting the positions of adjustable brackets 179 relative to the corresponding plates 181 so that temperature-sensitive devices 162 are taut and locking them together by tightening of fasteners.

At block 1012, with support frame 170 positioned within slat 112, fasteners 174 may be installed to attach support frame 170 to slat spar 138. In some embodiments, all of fasteners 174 may be positioned so that they can be accessed and installed by way of openings 176. For example, all of fasteners 174 may be installed at locations within a specific distance of openings 176, e.g. one meter. Thus, a technician may be able to reach all fasteners through the openings 176 manually or using a tool. Conveniently, in such embodiments, it may be possible to fully install sensors 162 and support frame 170 without any need for access panels in slat 112.

In contrast, in previous designs, wires were affixed directly to the slat spar at various locations along the length of the slat spar. Such designs typically required a technician to place the wires within the slat through a series of access panels in the slat's aft surface, and to install fasteners using the same access panels.

As described above, piccolo duct 134 is located within a movable slat, as are sensors 162 and support frame 170. Alternatively or additionally, anti-icing may be provided at a leading edge of a fixed wing. For example, some wings may have multiple sections, with fixed leading edges at some sections and movable slat's defining leading edges of other sections.

At block 1014, slat 112 may be withdrawn to its retracted position. The installation process may return to block 1002 for installation of sensors 162 and a support frame 170 in a subsequent slat.

As described above, monitoring unit 171 is installed into a movable slat 112. In other embodiments, monitoring assemblies may be installed in other types of wing structures, such as wings, flaps, stabilizers, ailerons, elevators or the like.

As described above, support frame 170 of temperature monitoring unit 171 is attached to a spar 138 of a slat 112. In other embodiments, the support frame may be configured for mounting to or reception by other structural elements of a wing structure. For example, support frame 170 may be attached to ribs, or to a structural element connected to ribs or spar 138.

Figure 8:
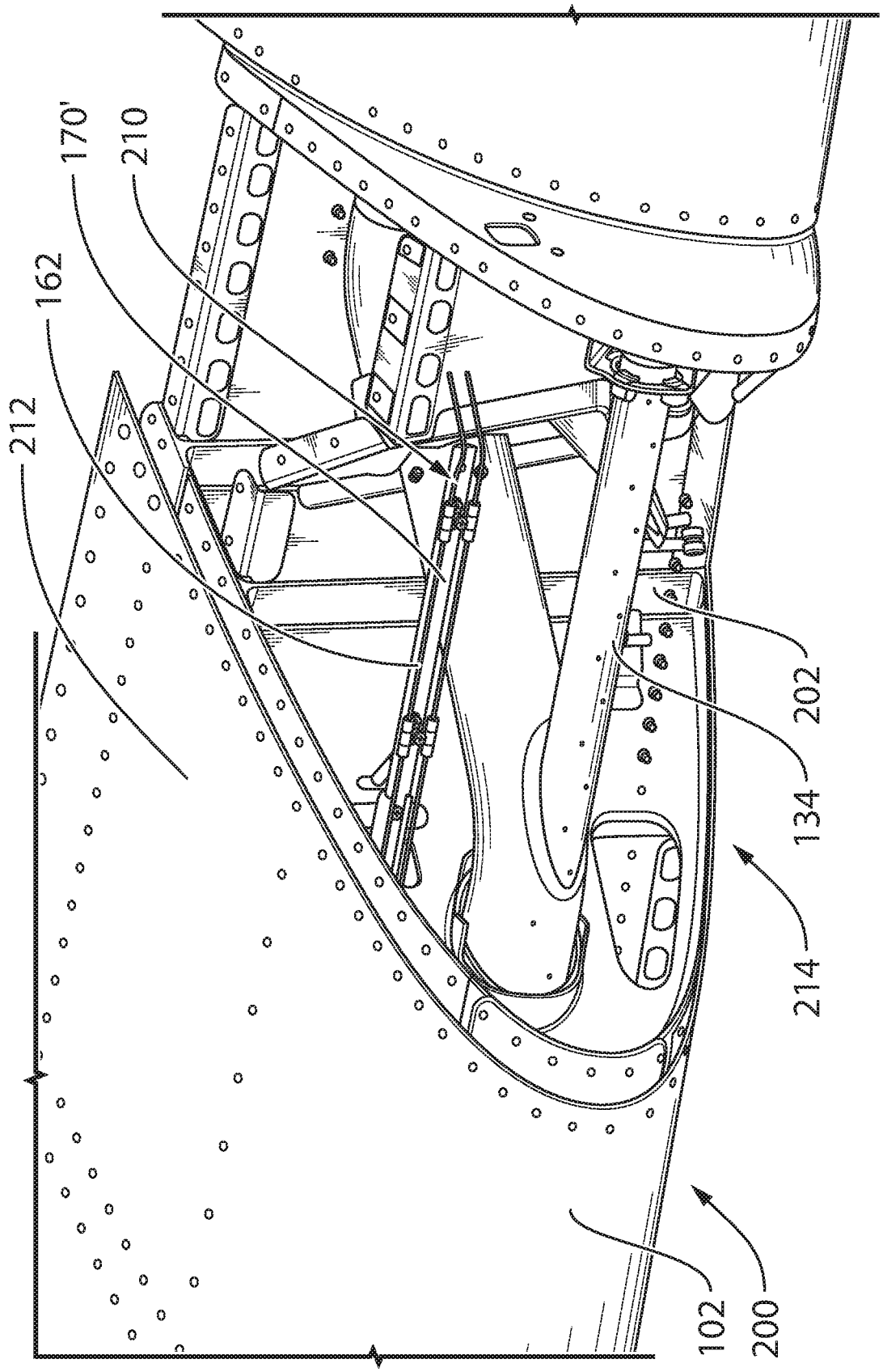
FIG. 8 is a perspective view showing installation of a temperature monitoring unit in a wing section with a fixed leading edge.

FIG. 8 depicts example installation of a monitoring unit into a wing section 200 with a fixed leading edge Fore chamber 204 contains a piccolo duct 134 configured to direct warm air against skin 208 of wing section 202.

The monitoring includes temperature-sensitive devices 162 and a support frame 170' and is substantially similar to monitoring unit 171 described above, except that support frame 170' is configured for reception along spar 202. Thus, support frame 170' may have different dimensions, fastener locations, etc., as compared with support frame 170

Monitoring unit 210 May be installed by attaching temperature-sensitive devices 162 to support frame 170' and mounting support frame 170' within the wing, substantially as described above with reference to monitoring unit 171.

Specifically, the interior of wing section 200 may be accessed through panels 212 in the outer skin of wing 102. Panels 212 may be removably attached to the wing structure, e.g., using fasteners, such that it is possible to remove any panel to define an opening 214 into the panel interior. Monitoring unit 210 may then be installed by inserting through opening 214.

As described above, temperature-sensitive devices 162 are selectively conductive wires. Other types of sensors could be used. For example, sensors 162 could be replaced with other selectively conductive elements, or with thermocouples. For example, a plurality of spaced-apart thermocouples attached to support frame 170 could be used to monitor a temperature condition over a span of an aircraft structure.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the detailed embodiments described above and illustrated are intended to be examples only. The invention is defined by the appended claims.

What is claimed is:

1. An aircraft wing structure, comprising:
   a skin defining an aerodynamic surface;
   a structural element disposed in an interior volume of the aircraft wing structure, the interior volume being at least partly defined by the skin; and
   a temperature monitoring unit removably installed as a unit in the interior volume the aircraft wing structure, the temperature monitoring unit comprising:
   a support frame removably installed to said structural element; and
   a temperature-sensitive device for monitoring a temperature condition over a span of said wing structure, the temperature sensitive device being attached to the support frame,
   wherein said structural element defines a channel within said interior volume, and wherein said support frame is slidably received in said channel.

2. The aircraft wing structure of claim 1, wherein the structural element comprises a first locating feature, and said support frame comprises a second locating feature for mating engagement with the corresponding first locating feature on said structural element.

3. The aircraft wing structure of claim 2, wherein said second locating feature comprises a track.

4. The aircraft wing structure of claim 1, wherein said temperature sensitive device comprises a plurality of parallel conductors extending along said span of said wing structure, said conductors in electrical communication with one another only at or above a threshold temperature, the conductors being separated by an insulator that melts at said threshold temperature.

5. The aircraft wing structure of claim 1, wherein said aircraft wing structure is a movable leading edge slat.

6. The aircraft wing structure of claim 5, wherein said movable leading edge slat defines a lateral opening when extended, and wherein said channel is positioned for reception of said support frame through said lateral opening.

7. The aircraft wing structure of claim 1, wherein said structural element is a spar.

8. The aircraft wing structure of claim 1, further comprising an anti-icing duct and wherein said support frame is mounted to said structural element to position said temperature-sensitive element along the anti-icing duct.

9. An aircraft comprising the aircraft wing structure of claim 1.

10. A method of installing a temperature monitoring unit for an anti-icing system in an aircraft wing structure, the method comprising:
   assembling the temperature monitoring unit by attaching a temperature-sensitive device to a support frame, said temperature-sensitive device being configured to monitor a temperature condition over a span of the aircraft wing structure;
   removably installing said temperature monitoring unit inside said aircraft wing structure; and
   sliding said support frame within a channel defined by a structural member of the aircraft wing structure.

* * * * *